(12) United States Patent
Kurian et al.

(10) Patent No.: US 11,188,515 B2
(45) Date of Patent: *Nov. 30, 2021

(54) PREVIEW PROCESSING AND AUTOMATIC CORRECTION OF BULK DATA FOR SOFTWARE AS A SERVICE APPLICATIONS

(71) Applicant: INTERNATIONAL BUSINESS MACHINES CORPORATION, Armonk, NY (US)

(72) Inventors: John Kurian, Bangalore (IN); Thanmayi Mruthyunjaya, Bangalore (IN); Ramya Rajendiran, Yemlur (IN); Raja Sreenivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 16/521,063

(22) Filed: Jul. 24, 2019

(65) Prior Publication Data

US 2019/0347252 A1 Nov. 14, 2019

Related U.S. Application Data

(63) Continuation of application No. 15/806,966, filed on Nov. 8, 2017, now Pat. No. 10,649,978.

(51) Int. Cl.
*G06F 16/00* (2019.01)
*G06F 16/23* (2019.01)
(Continued)

(52) U.S. Cl.
CPC ........ *G06F 16/2365* (2019.01); *G06F 16/214* (2019.01); *G06F 16/258* (2019.01); *G06F 16/27* (2019.01)

(58) Field of Classification Search
None
See application file for complete search history.

(56) References Cited

U.S. PATENT DOCUMENTS

2005/0021541 A1* 1/2005 Rangadass ............ G06Q 10/06
2008/0243884 A1 10/2008 Rubesh
(Continued)

OTHER PUBLICATIONS

Dobson "Using a Simple SQL Server Bulk Insert to View and Validate Data", https://www.mssqltips.com/sqlservertip/3446/using-a-simple-sql-server-bulk-insert-to-view-and-validate-data/, pp. 1-5, printed on Oct. 16, 2017.
(Continued)

*Primary Examiner* — Thu Nguyet T Le
(74) *Attorney, Agent, or Firm* — Dmitry Paskalov (57) ABSTRACT

The present invention may include a method for automatic correction and migration of a plurality of bulk data. The method may identify sources, where the sources include the plurality of bulk data. The method may identify a subset of the bulk data, where the subset represents one or more records selected from the plurality of bulk data. The method may upload the subset to an enterprise application. The method may determine an error list from the enterprise application based on the uploaded subset. The method may roll back the subset from the enterprise application and based on the determined error list, the method may match one or more rules to a one or more errors in the error list.

20 Claims, 5 Drawing Sheets

(51) Int. Cl.
  *G06F 16/27* (2019.01)
  *G06F 16/21* (2019.01)
  *G06F 16/25* (2019.01)

(56) References Cited

U.S. PATENT DOCUMENTS

| | | |
|---|---|---|
| 2008/0294587 A1 | 11/2008 | Qu |
| 2012/0246124 A1 | 9/2012 | Arasaratnam |
| 2012/0330911 A1 | 12/2012 | Gruenheid |
| 2014/0310233 A1 | 10/2014 | Catalano, Sr. et al. |
| 2015/0019472 A1 | 7/2015 | Miranda et al. |
| 2017/0068595 A1* | 3/2017 | Nautiyal ................. G06F 11/10 |
| 2019/0138629 A1 | 5/2019 | Kurian et al. |
| 2019/0370265 A1 | 12/2019 | Mehta |

OTHER PUBLICATIONS

Friedman "Best Practices Mitigate Data Migration Risks and Challenges", https://www.gartner.com/doc/2940619/best-practices-mitigate-data-migration, 1 page, published Dec. 9, 2014.
Mell et al., "The NIST Definition of Cloud Computing," National Institute of Standards and Technology, Sep. 2011, p. 1-3, Special Publication 800-145.
IBM: List of IBM Patents or Patent Applications Treated as Related (Appendix P), Dated Aug. 16, 2019, pp. 1-2.

* cited by examiner

PREVIEW PROCESSING AND AUTOMATIC CORRECTION OF BULK DATA FOR SOFTWARE AS A SERVICE APPLICATIONS

BACKGROUND

The present invention relates, generally, to the field of computing, and more particularly to data syncing and migration from different sources.

Bulk data syncing and migration involves transferring large amounts of data originating from different sources to an enterprise application. Typically, bulk data includes data records that may be organized in a structural format, such as a database. Bulk data syncing and migration are especially utilized by Software as a Service (SaaS) applications.

SaaS applications are software platforms based on software licensing and delivery models in which software is licensed on a subscription basis and is centrally hosted. SaaS applications are typically accessed by users using a thin client via a web browser and became a common delivery model for many business applications.

SUMMARY

According to one embodiment, a method, computer system, and computer program product for a bulk data automatic correction and migration tool is provided. The present invention may include a method for automatic correction and migration of a plurality of bulk data. The method may identify sources, where the sources include the plurality of bulk data. The method may identify a subset of the bulk data, where the subset represents one or more records selected from the plurality of bulk data. The method may upload the subset to an enterprise application. The method may determine an error list from the enterprise application based on the uploaded subset. The method may roll back the subset from the enterprise application and based on the determined error list, the method may match one or more rules to a one or more errors in the error list.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to data syncing and migration from different sources. The following described exemplary embodiments provide a system, method, and program product to, among other things, determine a set of rules for data migration by iteratively uploading a subset and matching the errors to specific rules that may convert the data to be compatible for the required service. Therefore, the present embodiment has the capacity to improve the efficiency of data migration by dynamically validating and adopting the bulk data for migration into specific enterprise application requirements.

As previously described, bulk data syncing and migration involves transferring large amounts of data originating from different sources to an enterprise application (i.e., an endpoint). Typically, bulk data includes data records that may be organized in a structural format, such as a database. Bulk data syncing and migration are especially utilized by Software as a Service (SaaS) applications.

Typically, each application stores the bulk data in different formats and structures. For example, the bulk data may be stored in JavaScript Object Notation (JSON), Extensible Markup Language (XML), or Comma Separated Values (CSV) formats. In addition, the bulk data may be encoded using encoding formats, such as UTF-8, UTF-16, or ISO-8859-1. Furthermore, cultural differences create different requirements of the format, such as date formats where, in the US, the month is before the day while, in Europe, the day is before the month. All of the aforementioned differences in format, encoding, and semantics make bulk data migration a cumbersome and time consuming process. As such, it may be advantageous to, among other things, implement a system that dynamically validating and adopting the bulk data for migration into specific enterprise application requirements.

According to one embodiment, a Bulk Data Automatic Correction and Migration Tool (BDACMT) may perform a preview process on a subset of customer data and identify the set of corrective actions to be performed on the data to achieve successful processing by the enterprise application. The preview processing may be performed by posting the subset on the enterprise application in a temporary fashion and rolling back the posting after determining an error list from the enterprise application. By analyzing the error list generated by the posting during the preview processing and by analyzing the requirements of the Application Programming Interfaces (APIs) of the enterprise application, the BDACMT may identify corrective rules (i.e., instructions) to be applied on the subset, such as data format changes, encoding changes, etc. to the subset data. Subsequently, the subset data may be updated recurrently using the corrective rules to comply with the APIs of the enterprise application, thus making the posting of the subset of data successful. Furthermore, after successful subset data conversion, the actual data may be converted with the same set of rules and submitted to the enterprise application for processing.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to perform a preview processing and automatic correction of bulk data for enterprise applications, such as SaaS applications.

Figure 1:
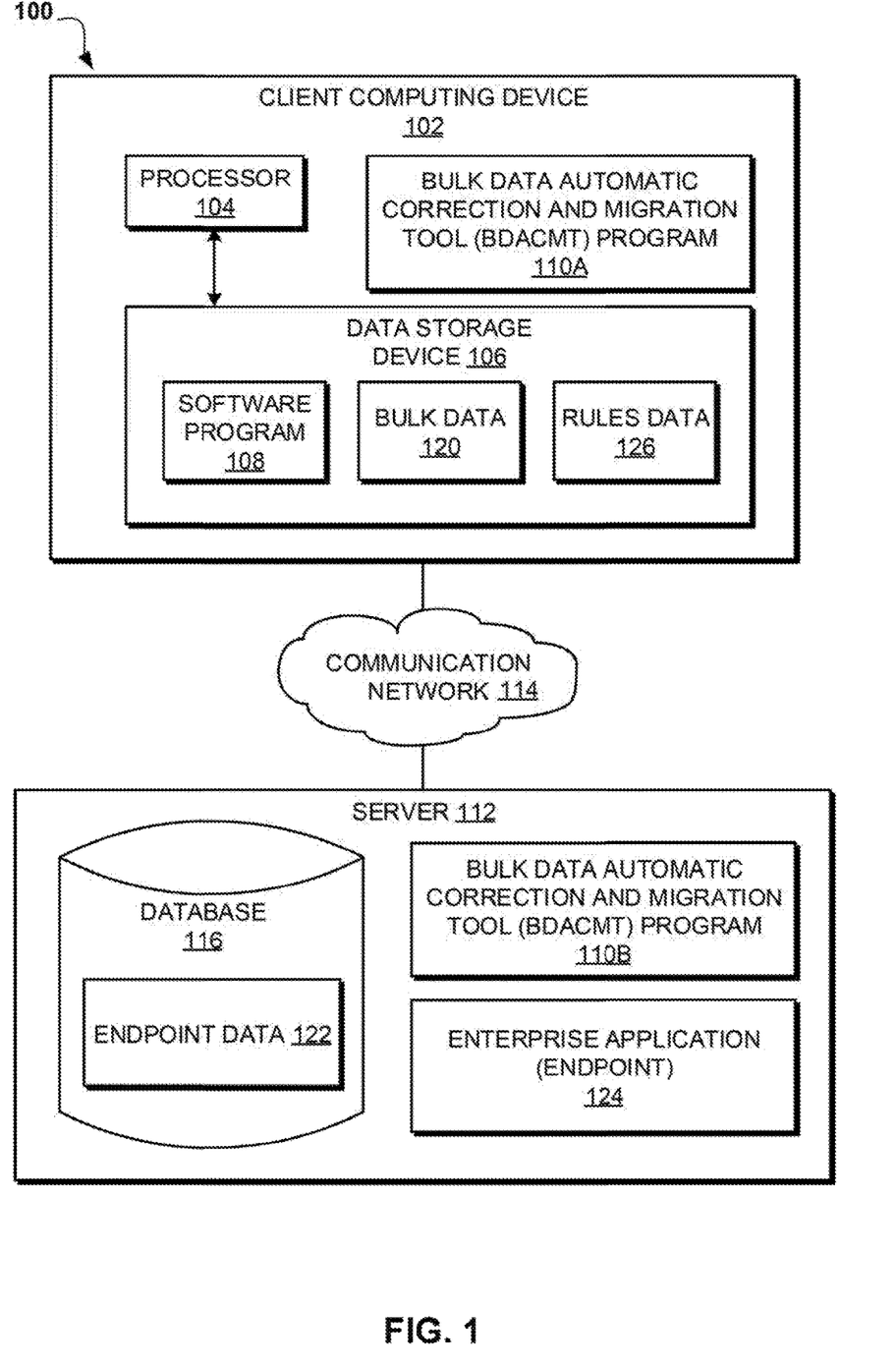
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host bulk data 120 and rules data 126, and host and run software program 108, and a BDACMT program 110A and communicate with the server 112 via the communication network 114, in accordance with one embodiment of the invention. Bulk data 120 may be data that a user has to migrate to a format compatible with the enterprise application 124. Rules data 126 may be a set of records where each record is associated with a computer instruction that may be executed to change the format of the bulk data 120. According to at least one embodiment, the rules data 126 may be in a database format, such as a table, that may include fields, such as an executable instruction, an error number associated with the instruction, an error description, a name of an enterprise application associated with the rule, date and time when the rule was used, and references to a similar records in the rules data 126. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a BDACMT program 110B and a database 116 and communicating with the client computing device 102 via the communication network 114, in accordance with embodiments of the invention. Database 116 may be configured to store and access endpoint data 122 that is in a data format and encoding compatible with the enterprise application 124. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the BDACMT program 110A, 110B may be a program capable of dynamically validating and adopting the bulk data for migration into specific enterprise application requirements. The BDACMT method is explained in further detail below with respect to FIG. 2.

Figure 2:
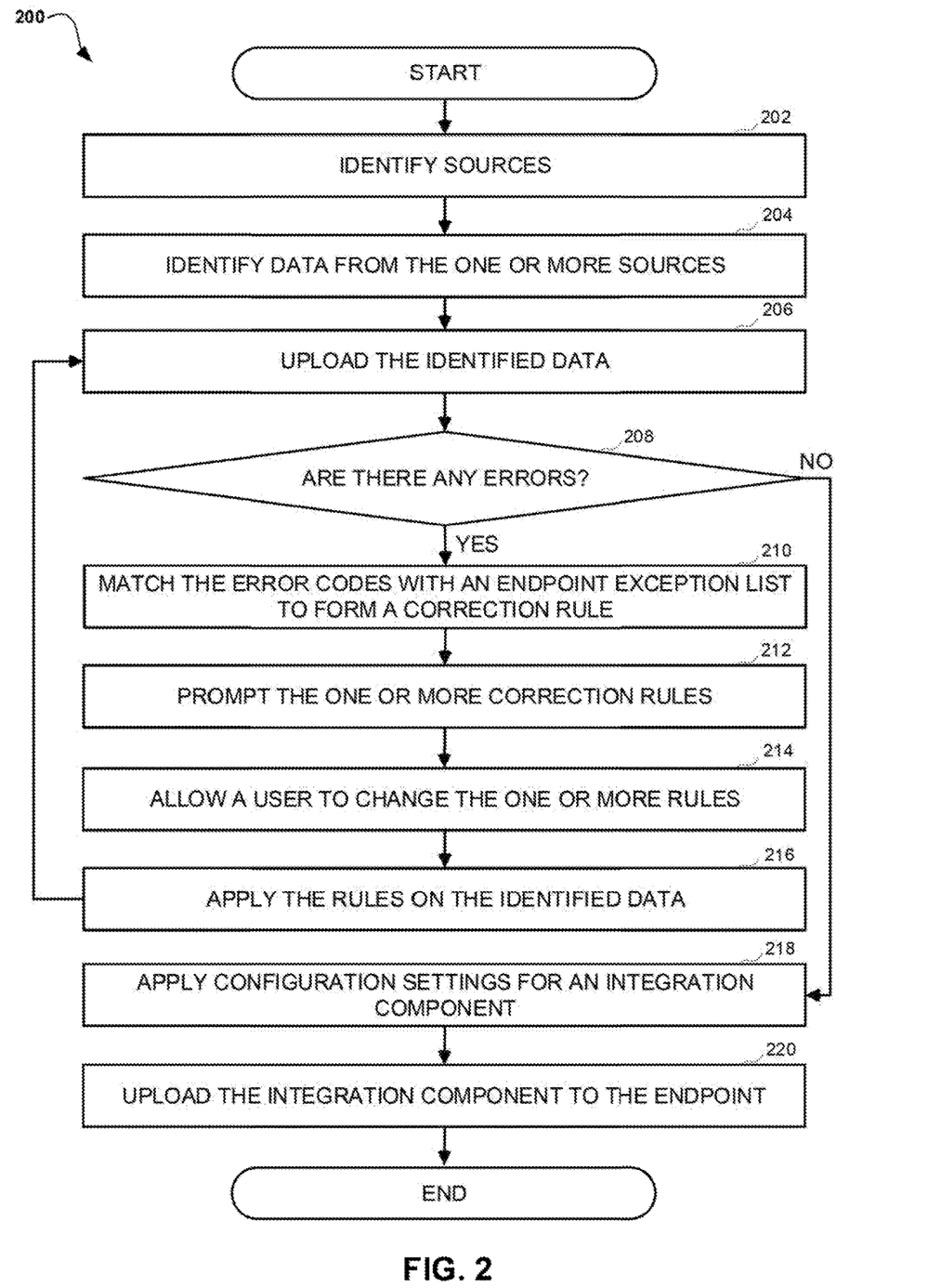
FIG. 2 is an operational flowchart illustrating a Bulk Data Automatic Correction and Migration Tool (BDACMT) process according to at least one embodiment.

Referring now to FIG. 2, an operational flowchart illustrating a BDACMT process 200 is depicted according to at least one embodiment. At 202, the BDACMT program 110A, 110B identifies sources. According to at least one embodiment, BDACMT program 110A, 110B may identify the bulk data sources before beginning of a migration. For example, BDACMT program 110A, 110B may analyze the existing sources of the enterprise application 124, such as endpoint data 122 and determine the required data structure, number of databases, number of files and their structure that has to be provided by a user before performing a successful migration.

Next, at 204, BDACMT program 110A, 110B identifies data from the one or more sources. According to at least one embodiment, BDACMT program 110A, 110B may identify a subset of data form each of the identified sources for uploading to the enterprise application 124. The subset of data may be determined by randomly selecting data sets from the identified data. For example, if identified sources contain customer data databases, BDACMT program 110A, 110B may chose limited client information from each identified sources and combine them to a data set. A number of randomly selected records may be dependent on the size of each source for example, if source 1 is double the size of source 2, BDACMT program 110A, 110B may choose twice as many records for the subset of data from the source 1 than from the source 2.

Next, at 206, BDACMT program 110A, 110B uploads the identified data. According to at least one embodiment, BDACMT program 110A, 110B may upload the subset of data to the enterprise application 124, such as by appending the subset to the endpoint data 122 and updating the APIs of the enterprise program 124. Then, in response to at least one error generated by the enterprise program 124, BDACMT program 110A, 110B may record all the errors generated by the enterprise program 124 and remove the uploaded subset of data from the enterprise data 122 (data rollback).

Then, at 208, the BDACMT program 110A, 110B determines whether there are any errors. According to at least one embodiment, BDACMT program 110A, 110B may check whether the enterprise program 124 and its APIs generated any errors during utilization of the subset of the data. For example, the enterprise program 124 may generate or return an error list in a format of a text file that may include error codes and corresponding error code descriptions. According to at least one embodiment, BDACMT program 110A, 110B may repeat the validation of the subset of the data until there are no errors left on the error list. If the BDACMT program 110A, 110B determines that there are any errors generated by the utilization of the subset of the data (step 208, "YES" branch), the BDACMT program 110A, 110B may continue to step 210 to match each one of the error codes with an endpoint exception list to form a correction rule. If the BDACMT program 110A, 110B determines that there are no errors generated by the utilization of the subset of the data (step 208, "NO" branch), the BDACMT program 110A, 110B may continue to step 218 to apply configuration settings for an integration component.

Next, at 210, BDACMT program 110A, 110B matches error codes with an endpoint exception list to form a correction rule. According to at least one embodiment, BDACMT program 110A, 110B may match the error codes with the endpoint specific exception lists and form the correction rule dynamically to fix the issue. For example, BDACMT program 110A, 110B may match the errors determined during the subset of the data upload and determine the appropriate correction rule to correct the error by matching the error code number to the corresponding rule error code in the rules data 126. In another embodiment, BDACMT program 110A, 110B may analyze the wording of the error and match it to an appropriate solution. For example, if a specific record of the subset of the data received an incorrect End of Line (EOL) while any other record did not receive the same error, the BDACMT program 110A, 110B may create a rule to substitute the EOL that received the error with another EOL symbols from the record that did not receive any error. In a further embodiment, BDACMT program 110A, 110B may analyze the words of the error and match it to the similar wording in the rule. For example, if the error states that the record has an incorrect encoding and has to be in UTF-16, BDACMT program 110A, 110B may search for every rule that includes transforming a record to a UTF-16 encoding.

Figure 3:
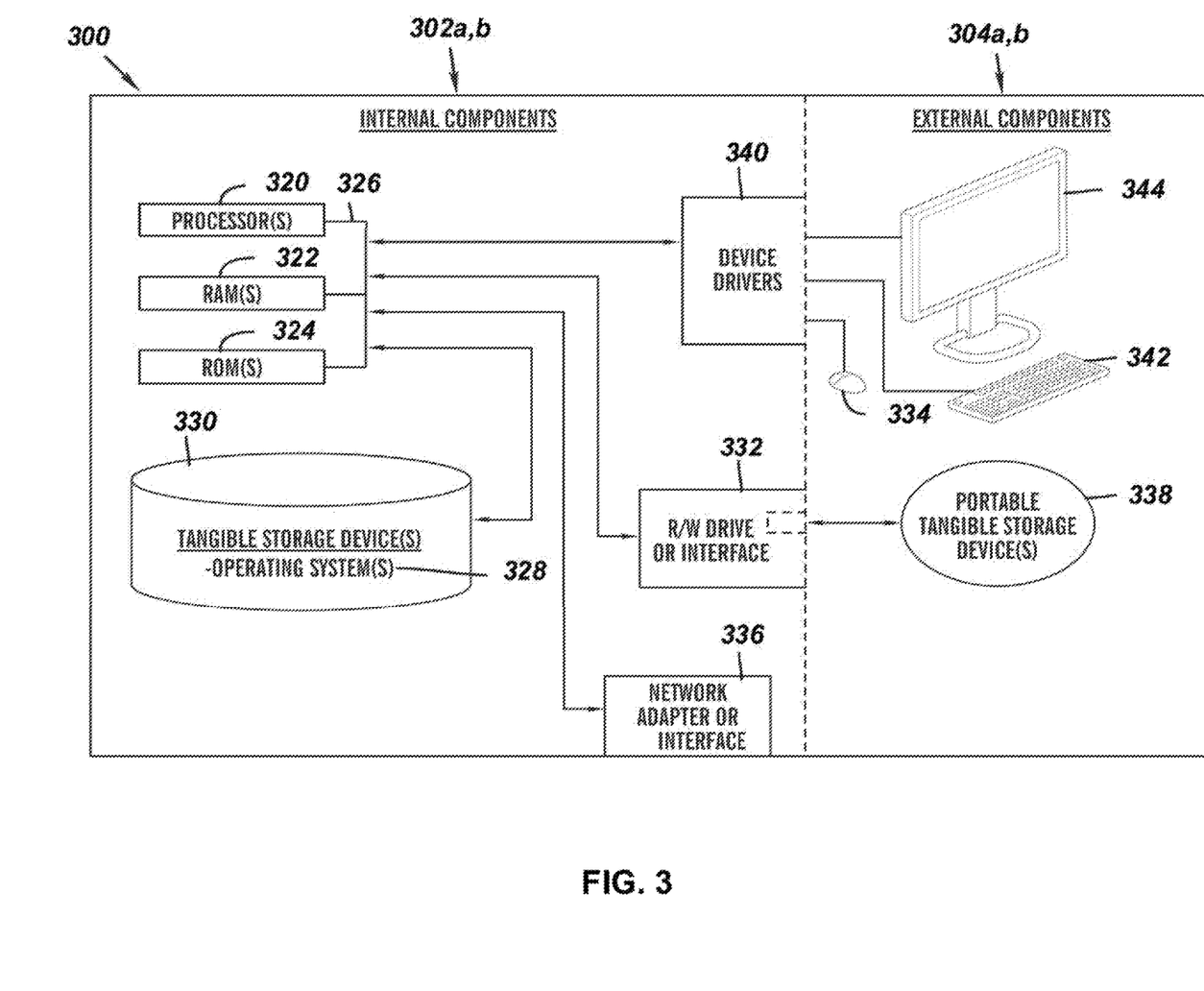
FIG. 3 is a block diagram of internal and external components of computers and servers depicted in FIG. 1 according to at least one embodiment.

Next, at 212, BDACMT program 110A, 110B prompts the one or more correction rules. According to at least one embodiment, BDACMT program 110A, 110B may display the matched in step 210 rules to a user via external components 304a, such as a computer display monitor 344 (FIG. 3). BDACMT program 110A, 110B may display a rule in conjunction with the corresponding error with a possibility to further review the record that generated the error. In another embodiment, BDACMT program 110A, 110B may display more than one rule with a percentage representing the probability value that the rule is appropriate to solve the current error. According to at least one embodiment, the percentage representing the probability value that the rule is appropriate to solve the current error may be determined by BDACMT program 110A, 110B based on previous runs that may be stored in rules data 126 or based on a matching wording between the rule and the error. In another embodiment, the BDACMT program 110A, 110B may add the one or more correction rules to the rule database and prompt the new rules identified via display monitor 344.

Next, at 214, BDACMT program 110A, 110B allows a user to change the one or more rules. According to at least one embodiment, BDACMT program 110A, 110B may allow a user of client computing device 102 to amend the rules that were displayed in step 212. For example, if the date field of the record generated an error, and a user recognizes that the error is due to the date and month fields are switched, the user may change or update the rule to switch the day and the month fields in order to eliminate the error. If a user amended the rule the BDACMT program 110A, 110B may update the rules data 126 with a user updated rule or alternatively, add the rule as a new rule in the rules data 126.

Next, at 216, BDACMT program 110A, 110B applies the rules on an identified data. According to at least one embodiment, BDACMT program 110A, 110B may arrange the rules in a configuration settings component, where the configuration settings component may include an executing script that applies the rules on the subset of the data. For example, if the only error was that the subset is not in a UTF-8 encoding format, BDACMT program 110A, 110B may generate a server side script, such as PHP script and execute it on server 112 or client computing device 102 to convert the subset to the UTF-8 encoding format.

Next, at 218, BDACMT program 110A, 110B applies the configuration settings for an integration component. According to at least one embodiment, if BDACMT program 110A, 110B uploaded the subset of data without any errors, BDACMT program 110A, 110B may use the configuration settings that includes all the relevant rules to transform the bulk data into a compatible format for the enterprise application, such as rules that may convert bulk data 120 to a compatible data with the enterprise application 124.

Next, at 220, BDACMT program 110A, 110B uploads the integration component to the endpoint 124. According to at least one embodiment, after converting the bulk data into a compatible data for the enterprise application 124, BDACMT program 110A, 110B may upload the converted data to endpoint data 122 and update the API components of the enterprise application 124 that new data was added.

It may be appreciated that FIG. 2 provides only an illustration of one implementation and does not imply any limitations with regard to how different embodiments may be implemented. Many modifications to the depicted environments may be made based on design and implementation requirements.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the BDACMT program 110A in the client computing device 102, and the BDACMT program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the BDACMT program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the BDACMT program 110A in the client computing device 102 and the BDACMT program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the BDACMT program 110A in the client computing device 102 and the BDACMT program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
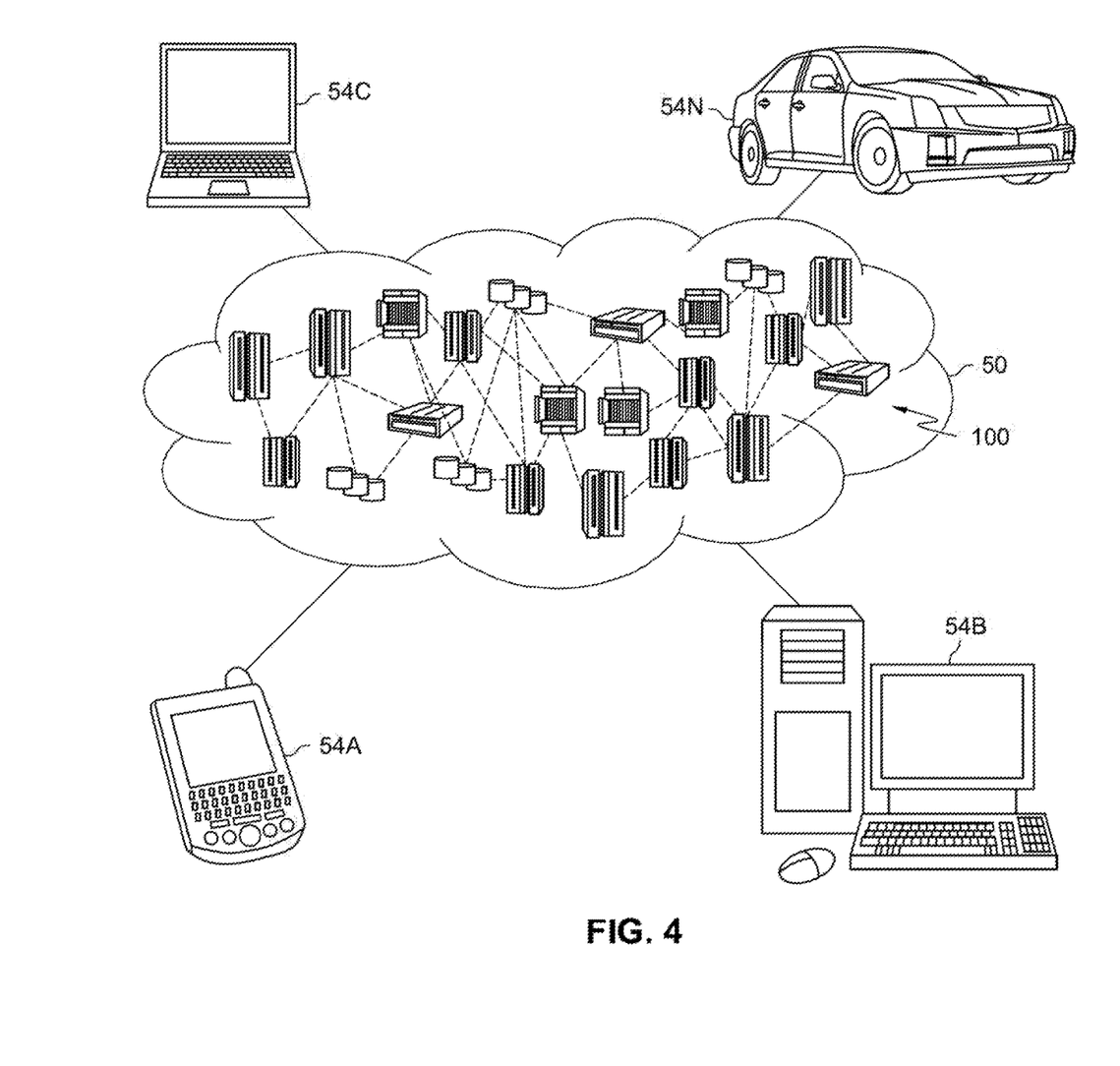
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
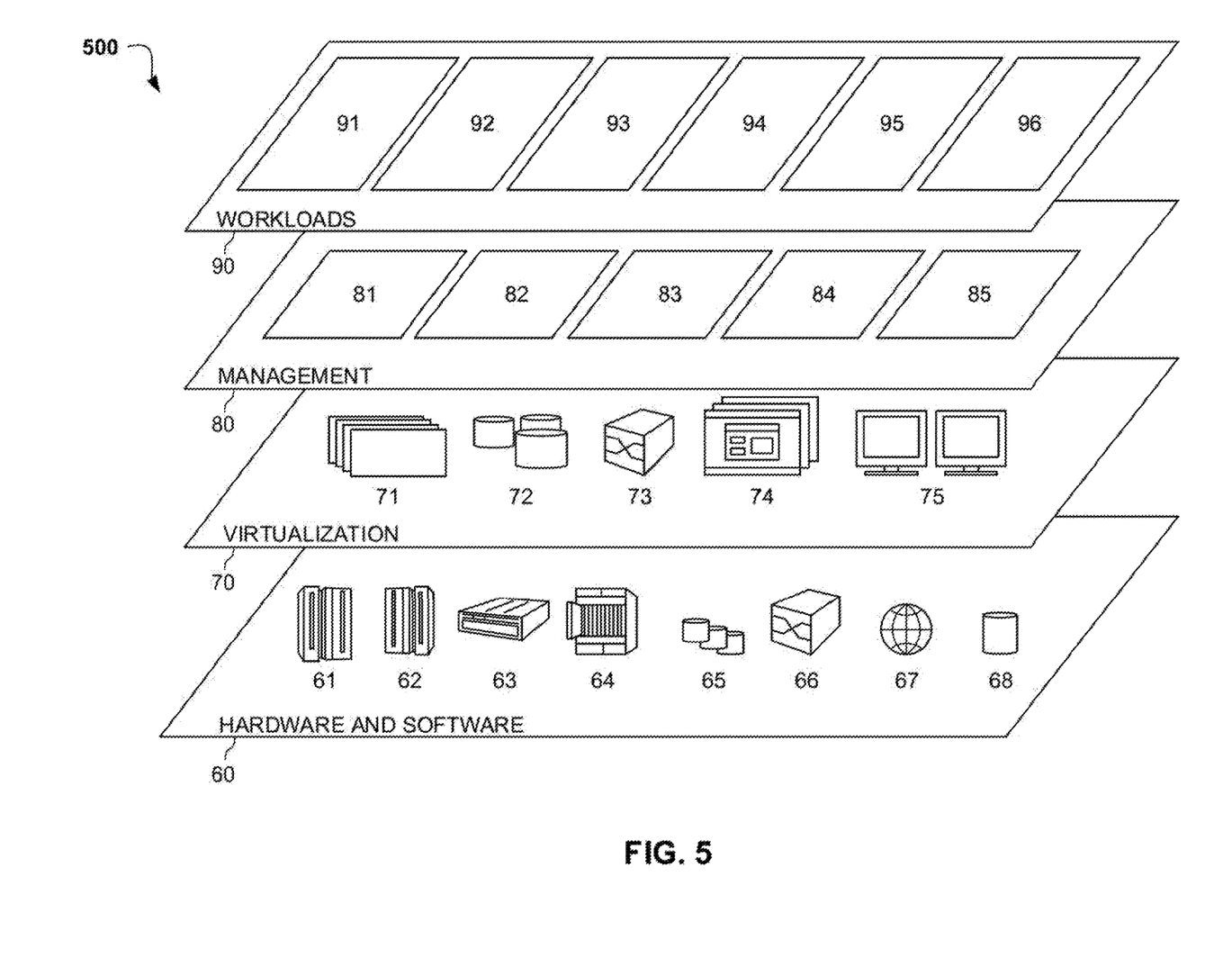
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bulk data automatic correction and migration 96. bulk data automatic correction and migration 96 may relate to analyzing sources for bulk data that may be added to an enterprise application database, determining the rules to be applied to convert the bulk data to a compatible data format by analyzing errors determined from uploading and rolling back the subset of the bulk data to the enterprise application and matching the corresponding rules to correct the determined errors, and using the rules converting the bulk data to the data compatible with the enterprise program.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for automatic correction and migration of a plurality of bulk data, the method comprising:
   identifying one or more sources, wherein the one or more sources include the plurality of bulk data;
   identifying a subset of the bulk data, wherein the subset is identified by combining a number of randomly selected records from each one of the identified one or more sources, and wherein the number of randomly selected records from each one of the identified one or more sources is proportional to a size of each of the identified one or more sources;
   uploading the subset to an enterprise application;
   determining an error list from the enterprise application based on the uploaded subset;
   in response to an error being on the error list, removing the subset from the enterprise application;
   matching one or more rules to one or more errors in the error list based on the determined error list and a plurality rule data; and
   converting the subset using the matched one or more rules.

2. The method of claim 1, further comprising:
   based on matching the one or more rules to the one or more errors in the error list, displaying the one or more rules and a corresponding to each rule the one or more errors in the error list to a user;
   allowing the user to change the one or more rules; and
   in response to the user making a change to the one or more rules, updating a rule data with the changed one or more rules, wherein the rule data stores all the rules for the bulk data conversion to the enterprise application.

3. The method of claim 2, wherein the rule data comprising:
   an error number;
   an error description, wherein the error description corresponds to the error number; and
   the one or more rules corresponding to the error number.

4. The method of claim 1, further comprising:
   applying the matched rules to convert the bulk data into a compatible data, wherein the compatible data is in a format compatible to the enterprise application; and
   uploading the compatible data to the enterprise application.

5. The method of claim 1, wherein identifying a subset of the bulk data is based on randomly selecting one or more records from the bulk data, wherein the selected one or more records are based on a size of each one of the identified sources.

6. The method of claim 1, wherein the one or more records selected from the plurality of the bulk data are selected randomly based on a size of the bulk data.

7. The method of claim 1, wherein matching one or more rules to one or more errors in the error list is performed by a probability value, wherein the probability value is determined based on matching one or more words from the one or more rules to one or more words of the one or more errors in the error list.

8. A computer system for automatic correction and migration of a plurality of bulk data, the computer system comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising;
   identifying one or more sources, wherein the one or more sources include the plurality of bulk data;
   identifying a subset of the bulk data, wherein the subset is identified by combining a number of randomly selected records from each one of the identified one or more sources, and wherein the number of randomly selected records from each one of the identified one or more sources is proportional to a size of each of the identified one or more sources;
   uploading the subset to an enterprise application;
   determining an error list from the enterprise application based on the uploaded subset;
   in response to an error being on the error list, removing the subset from the enterprise application;
   matching one or more rules to one or more errors in the error list based on the determined error list and a plurality rule data; and converting the subset using the matched one or more rules.

9. The computer system of claim 8, further comprising:
   based on matching the one or more rules to the one or more errors in the error list, displaying the one or more rules and a corresponding to each rule the one or more errors in the error list to a user;
   allowing the user to change the one or more rules; and
   in response to the user making a change to the one or more rules, updating a rule data with the changed one or more rules, wherein the rule data stores all the rules for the bulk data conversion to the enterprise application.

10. The computer system of claim 9, wherein the rule data comprising:
    an error number;
    an error description, wherein the error description corresponds to the error number; and
    the one or more rules corresponding to the error number.

11. The computer system of claim 8, further comprising:
    applying the matched rules to convert the bulk data into a compatible data, wherein the compatible data is in a format compatible to the enterprise application; and
    uploading the compatible data to the enterprise application.

12. The computer system of claim 8, wherein identifying a subset of the bulk data is based on randomly selecting one or more records from the bulk data, wherein the selected one or more records are based on a size of each one of the identified sources.

13. The computer system of claim 8, wherein the one or more records selected from the plurality of the bulk data are selected randomly based on a size of the bulk data.

14. The computer system of claim 8, wherein matching one or more rules to one or more errors in the error list is performed by a probability value, wherein the probability value is determined based on matching one or more words from the one or more rules to one or more words of the one or more errors in the error list.

15. A computer program product for automatic correction and migration of a plurality of bulk data, the computer program product comprising:
    one or more computer-readable tangible storage medium and program instructions stored on at least one of the one or more tangible storage medium, the program instructions executable by a processor, the program instructions comprising:
    program instructions to identify one or more sources, wherein the one or more sources include the plurality of bulk data; program instructions to identify a subset of the bulk data, wherein the subset is identified by program instructions to combine a number of randomly selected records from each one of the identified one or more sources, and wherein the number of randomly selected records from each one of the identified one or more sources is proportional to a size of each of the identified one or more sources;
    program instructions to upload the subset to an enterprise application;
    program instructions to determine an error list from the enterprise application based on the uploaded subset;
    in response to an error being on the error list, program instructions to remove the subset from the enterprise application; and
    program instructions to match one or more rules to one or more errors in the error list based on the determined error list and a plurality rule data.

16. The computer program product of claim 15, further comprising:
    based on matching the one or more rules to the one or more errors in the error list, program instructions to display the one or more rules and a corresponding to each rule the one or more errors in the error list to a user;
    program instructions to allow the user to change the one or more rules; and
    in response to the user making a change to the one or more rules, program instructions to update a rule data with the changed one or more rules, wherein the rule data stores all the rules for the bulk data conversion to the enterprise application.

17. The computer program product of claim 16, wherein the rule data comprising:
    an error number;
    an error description, wherein the error description corresponds to the error number; and
    the one or more rules corresponding to the error number.

18. The computer program product of claim 15, further comprising:
    program instructions to apply the matched rules to convert the bulk data into a compatible data, wherein the compatible data is in a format compatible to the enterprise application; and program instructions to upload the compatible data to the enterprise application.

19. The computer program product of claim 15, wherein program instructions to identify a subset of the bulk data is based on randomly selecting one or more records from the bulk data, wherein the selected one or more records are based on a size of each one of the identified sources.

20. The computer program product of claim 15, wherein the one or more records selected from the plurality of the bulk data are selected randomly based on a size of the bulk data.

\* \* \* \* \*